2 Sheets—Sheet 1.
C. J. MANN.
UNLOADING GRAIN VESSELS.
No. 188,924. Patented March 27 1877.
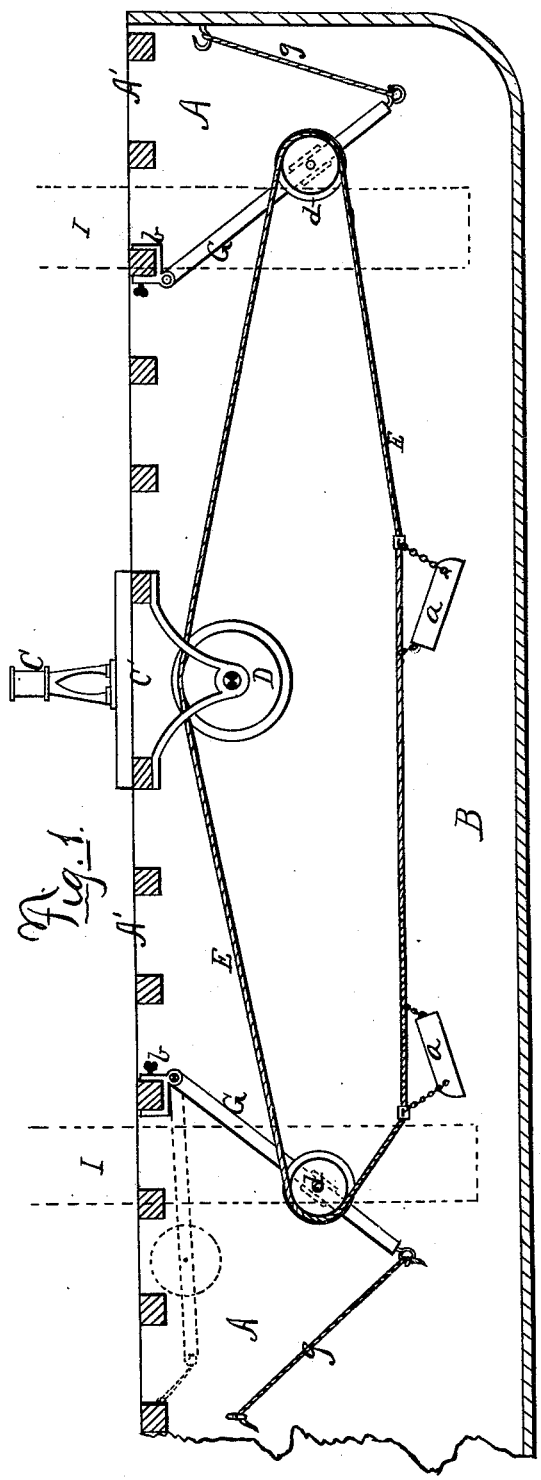
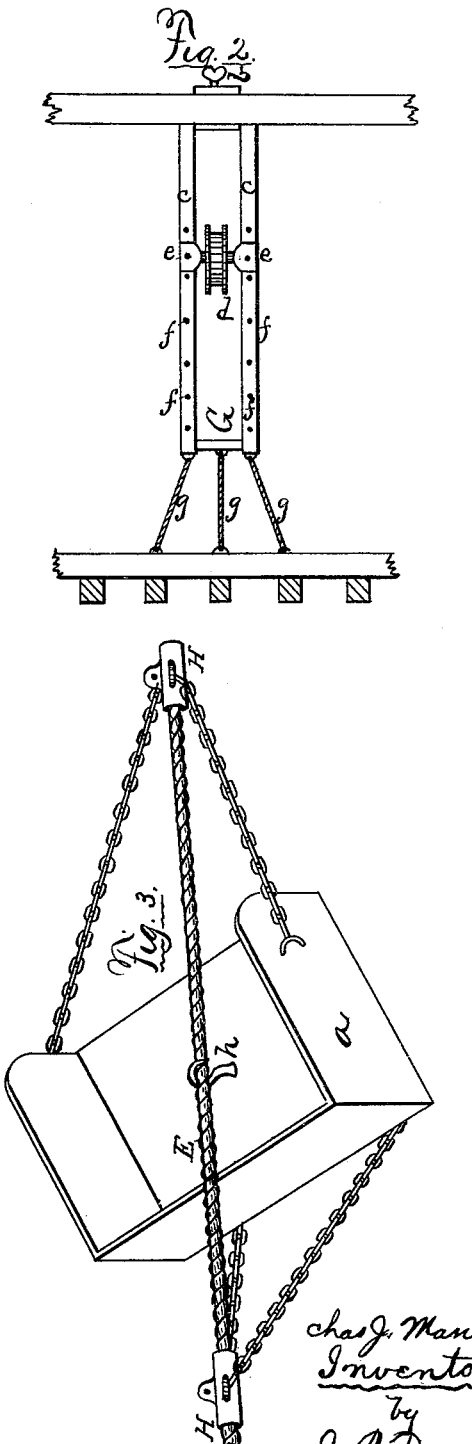
Chas. J. Mann
Inventor,
by J. R. Drake
atty.
Witnesses:
J. R. Drake
T. H. Parsons 2 Sheets—Sheet 2.

C. J. MANN.
UNLOADING GRAIN VESSELS.

No. 188,924. Patented March 27, 1877.

Witnesses:
J. R. Drake.
N. H. Parsons.

Chas. J. Mann
Inventor,
by
J. R. Drake
atty.

UNITED STATES PATENT OFFICE.

CHARLES J. MANN, OF BUFFALO, NEW YORK.

IMPROVEMENT IN UNLOADING GRAIN-VESSELS.

Specification forming part of Letters Patent No. 188,924, dated March 27, 1877; application filed March 7, 1877.

*To all whom it may concern:*

Be it known that I, CHARLES JAMES MANN, of Buffalo, in the county of Erie and State of New York, have invented new and useful Improvements in Devices for Shoveling Grain in Holds of Vessels, which improvements are fully set forth in the following specification and accompanying drawings, in which—

Figure 4:
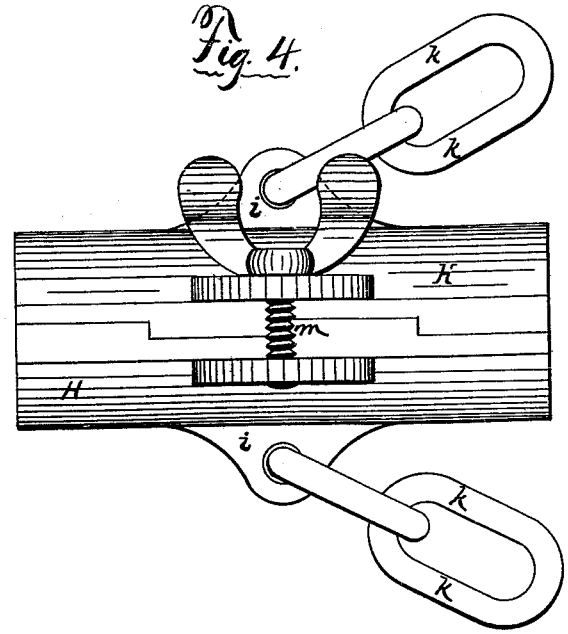
Figure 5:
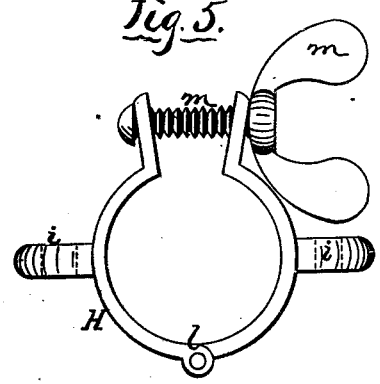

Figure 1 is a side elevation, in section, of a part of a vessel's hold, showing the shoveling apparatus and attachments; Fig. 2, plan of the hinged arms used in connection with the shovels and ropes; Fig. 3, perspective of a bucket or shovel, with the clamp attachments and hook. Fig. 4 is the chain-clamp for fastening on and unfastening the buckets; Fig. 5, end view of the same.

This invention relates to improvements in placing portable machinery or devices in vessels' holds for shoveling the grain to feed the elevator-legs placed therein, more especially in enabling floating elevators to more speedily discharge cargoes in any harbors or ports; and the invention consists in arranging in a vessel, in connection with an engine and an endless rope or chain, and its buckets or shovels, removable arms, two at each end of the vessel or hold, clamped to the beams (underneath) of the decks, and hinged thereto, so as to swing down, enabling the buckets to work down as the cargo is gradually discharged, said arms provided with a pulley in a sliding frame or axle, and the pulley carrying the shovel rope or chain, so that the shovels will feed the elevator-legs gradually from the top to the bottom of the vessel's hold, till the cargo is entirely discharged; also, in attaching to the inside of the buckets a hook to catch on the drawing-rope, and raise the buckets above the grain or floor when desired, while other buckets (or shovels) are in motion; also, in a hinged clamp that attaches the buckets to the endless chain or rope, and which allows the buckets to be moved back or forth on the rope while in motion, or taken entirely off at any point, without stopping the engine, and thereby losing valuable time, as in discharging vessels time is a very expensive and important consideration—all as hereinafter specified.

A A represent a section of a vessel; B, the hold; C, the engine, which is double-acting, and operates a horizontal shaft with two pulleys, D D, attached to the under side of the platform C', on which the engine or engines stand, and which extend down into the hold below the decks A', as shown in Fig. 1. E is an endless rope, belt, or chain, and which extends from one end of the vessel to the other, said rope or chain running around the pulleys D D, there being two sets of buckets, *a a*, two endless ropes, E, working side by side in the hold, the double-acting engine operating the double set; when one set is moving forward the other is moving back. At both ends of the vessel's hold is attached, by an open clamp and set-screw, *b*, one or more arms, G, (see Figs. 1 and 2,) consisting of an open frame, *c c*, the upper part hinged to the clamp *b*, and the clamp attached, as shown in Fig. 1, to a beam on the under side of the deck A', the clamp allowing of its removal to a point nearer or farther off, as the unloading may require. A movable pulley, *d*, is set in a sliding frame or axle, *e*, around which the endless bucket-rope E works. By means of pins or thumb-screw in said frame *e*, and corresponding holes *f f* in the lever-frames *c c*, this pulley is set up high when the hold is full of grain, and is gradually set down lower, as the bulk diminishes as the cargo is unloaded. Four of these devices will be enough for any vessel, two at each end; but if compartments are to be unloaded they can be set as shown in Fig. 1, the endless rope E merely being made shorter or longer, as the case may require.

This device is very important in connection with automatic shovels, as it can be used without stopping the machinery, and, consequently, the unloading, the devices now in use being stationary or removable eyes attached to the beams, requiring a stoppage of the machinery when the cargo lowers.

The lower ends of these arms G are held by tackle *g g*, which is let out as the arm G is lowered. The position of these arms when there is a full cargo to be unloaded is shown in dotted lines in Fig. 1, and the drawing shows the position when the cargo is nearly discharged. The "buckets" or "shovels," so called, *a a*, are of the usual shape. About in the center of the inside I fasten a hook, $h$, the function of which is very important. When a portion of the cargo has been discharged in one part of the vessel, or into one boat alongside, and another is still being loaded or discharged, it is important to prevent the buckets from dragging back and forth on the bottom or on the grain; therefore the hook $h$ is provided and the bucket hooked onto the endless rope E, as shown in Fig. 3. This prevents the stopping of the whole work to take off these buckets, as is now the case, and though a very simple matter it is one of great importance in the discharging of grain-vessels, saving in time and money, as a man can hook them up as they are running.

Another important feature is the clamps H H, which are attached by the eyes $i$ $i$ and side chains $k$ $r$ to the buckets $a$ $a$. This clamp is round, as in Fig. 5, and hinged at the back $l$, so as to open to disconnect it from the endless rope E, or slide the buckets forward or back thereon, to change their position on the rope, according to the requirements of the cargo. These clamps enable me to do this without stopping the machinery, and, consequently, the unloading, and by merely turning the screw $m$ on each clamp a man can do this while the whole set are working.

I I (dotted lines) represent two elevator-legs which the shovels feed.

I claim—

1. In combination with the pulleys or drums D D, endless rope E, and buckets $a$ $a$, the adjustable sheaves or pulleys $d$ $d$, substantially as and for the purpose specified.

2. In combination with the endless rope E and buckets $a$ $a$, the arm or arms G $c$ $c$ $e$ $f$, with the adjustable pulley $d$, all arranged and operating substantially as and for the purpose specified.

3. In combination with the buckets (shovels or scoops) $a$ $a$, and attached thereto in the center, the hook $h$, (or its equivalent,) as and for the purpose specified.

4. In combination with the shovels $a$ $a$, chains $k$ $k$, and endless rope E, the movable clamps H H, hinged at the back $l$, and fastened by the thumb-screw $m$, substantially as and for the purpose specified.

In witness whereof I have hereunto signed my name in the presence of two subscribing witnesses.

CHARLES J. MANN.

Witnesses:
 J. R. DRAKE,
 T. H. PARSONS.